June 9, 1953          C. OTTO          2,641,575
COKE OVEN BUCKSTAY STRUCTURE
Filed Jan. 21, 1949          2 Sheets-Sheet 1
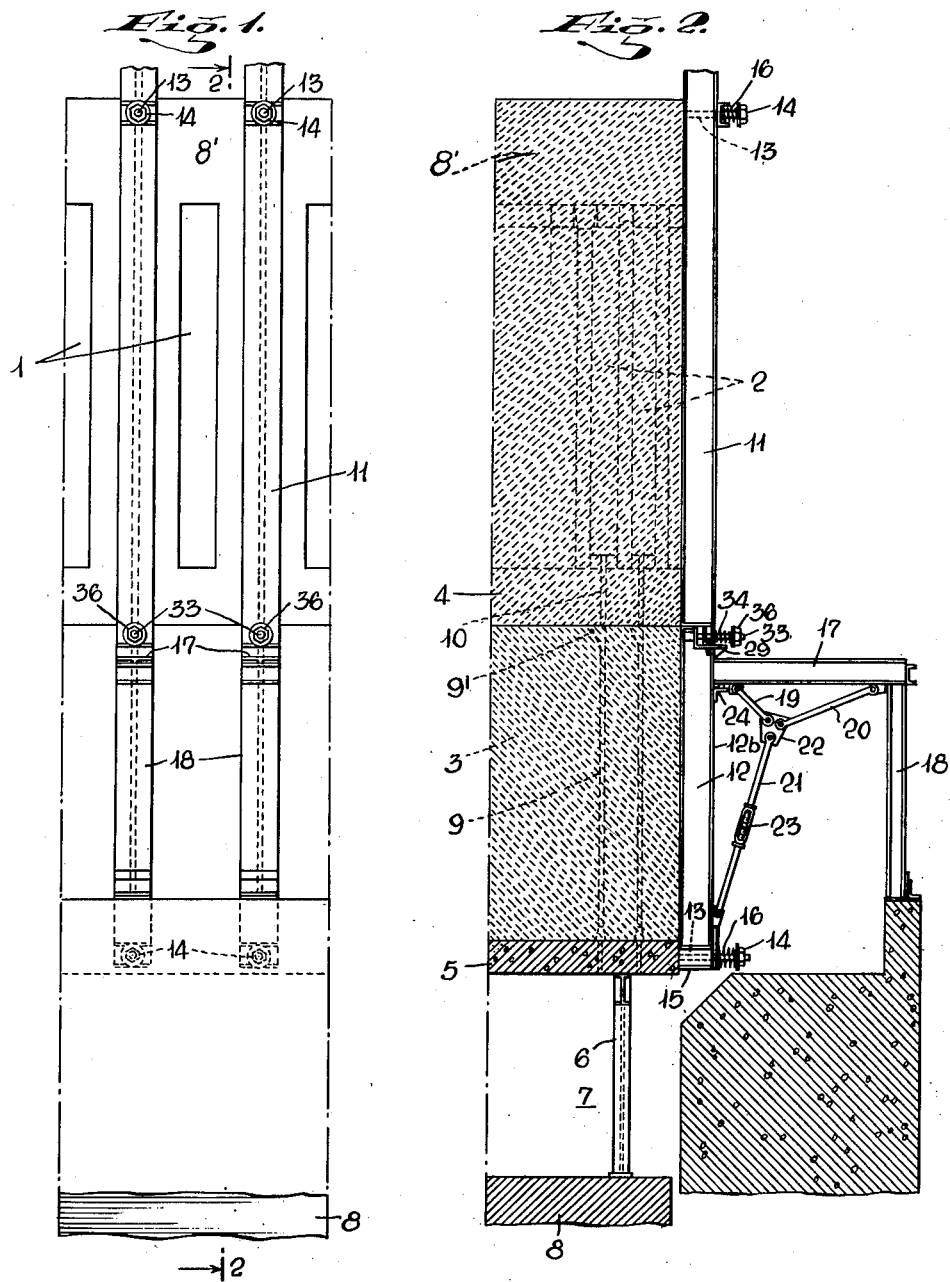
INVENTOR
CARL OTTO
BY
John E. Hubbell
ATTORNEY

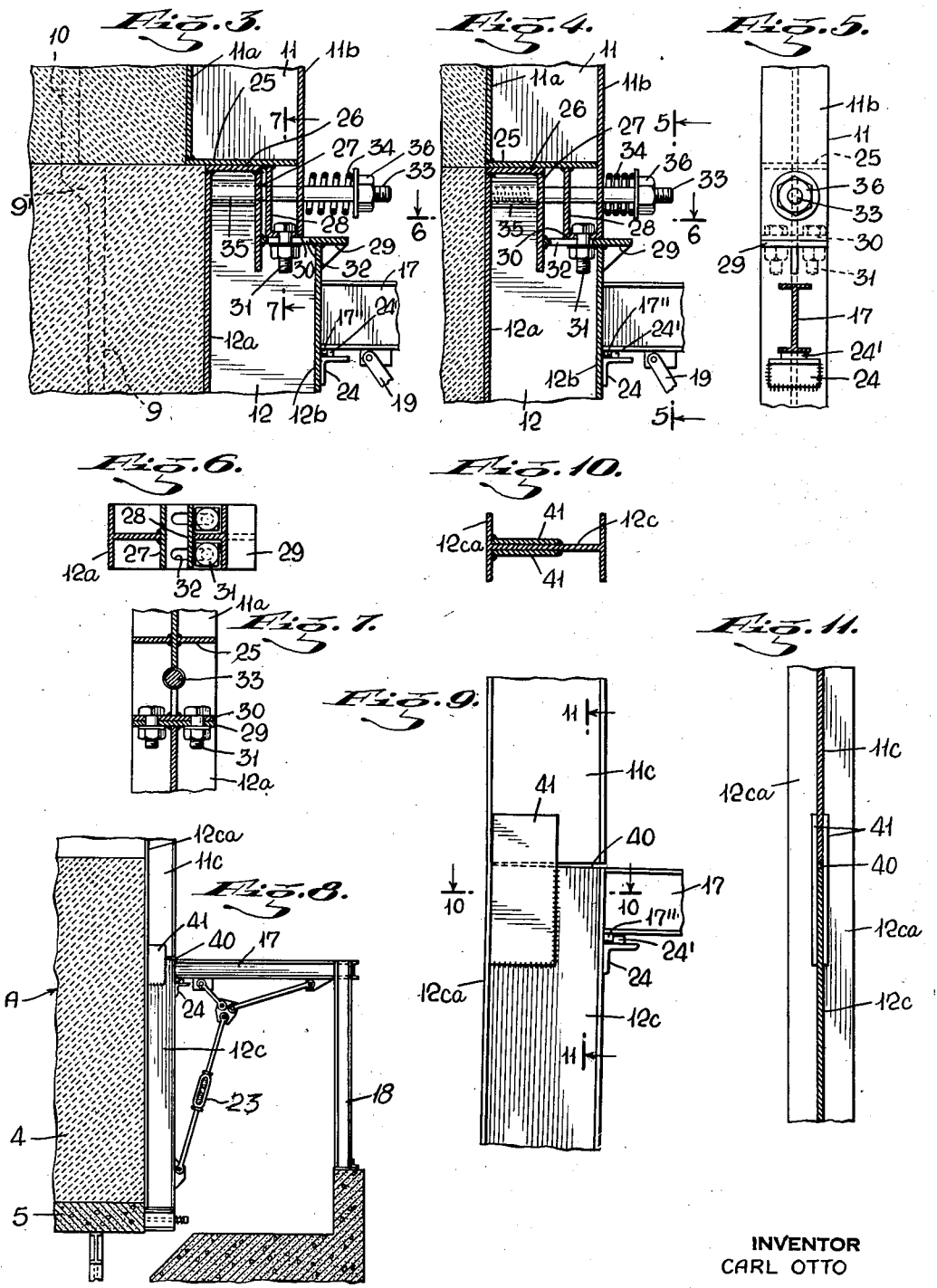

Patented June 9, 1953

2,641,575

UNITED STATES PATENT OFFICE 2,641,575

COKE OVEN BUCKSTAY STRUCTURE

Carl Otto, Manhasset, N. Y.

Application January 21, 1949, Serial No. 71,829

5 Claims. (Cl. 202—268)

The general object of the present invention is to provide a horizontal coke oven battery of any conventional type, having regenerator or other preheating means below the oven chambers, with buckstays of improved construction and associated in a novel manner with means for opposing and regulating the thermal expansion of the coke oven brickwork. A more specific object of the present invention is to provide a buckstay construction in which the portions of each buckstay respectively above and below a level adjacent, but somewhat below the oven floor level, have a freedom for relative horizontal movements in a direction transverse to the length of the battery, not permitted in the coke oven batteries now in general use.

The character of the relative movements permitted the upper and lower sections of the buckstays are dependent upon the thermal characteristics of the coke oven brickwork. As is well known, it is almost universal present day practice to form the oven chamber walls of bricks, usually silica bricks, which have a relatively high co-efficient of thermal expansion. However, the subjacent section of the battery brickwork, including the regenerators or other preheating provisions is sometimes formed wholly of silica bricks, sometimes wholly of clay bricks which have a much smaller co-efficient of thermal expansion than silica bricks, and sometimes has a lower portion formed of clay bricks and has an upper portion formed of silica bricks. When the lower section of the battery is formed wholly of clay bricks and the upper section of the battery is formed of silica bricks, I provide a buckstay structure comprising upper and lower sections so arranged that as the battery is heated up and expands, the lower end of each upper buckstay section may move bodily relative to the upper end of the corresponding lower buckstay section in a direction transverse to the battery for a horizontal distance of several inches. The relative movement thus permitted may amount to four or more inches when the oven chambers are forty feet or so long.

When the lower section of the battery structure is formed wholly of silica bricks, or has a substantial upper portion formed of silica bricks, the upper end portion will have a horizontal expansion transverse to the length of the bolt about equal to the horizontal expansion of the adjacent portion of the upper section of the battery. The cooler portion of the lower section of the battery adjacent the battery foundation or supporting slab will have a substantially smaller expansion transverse to the length of the battery. In such case, I hinge connect the adjacent ends of the upper and lower sections of the buckstays so that as the battery is heated up and expands, the lower buckstay sections turn relative to the upper sections, about a horizontal axis parallel to and adjacent the corresponding side of the battery brickwork. In a preferred form of the invention the hinge joint between the upper and lower sections of each buckstay comprises an integral portion of the beam, usually an I-beam, which is transversely cut in two, except for said integral portion, to thereby form relatively movable upper and lower buckstay sections. When the buckstay sections are of I-beam cross-section, the integral hinge connecting portion may be formed by the I-beam flange which bears against the adjacent side of the battery.

In a preferred form of the present invention, I directly oppose the tendency of the upper end of each lower buckstay section to move horizontally away from the longitudinal center plane of the battery, as the latter is heated up and expands, by reinforcing means of the type disclosed and claimed in my prior Patent 2,199,510 of May 7, 1940. Such reinforcing means comprises a horizontal strut extending between the upper portion of the lower buckstay section and a vertical strut or post laterally displaced from the adjacent side of the battery. The reinforcing means also comprises a linked structure comprising a lower link pivotally connected to the lower end of the lower buckstay section and having its upper end pivotally connected to the lower ends of second and third links. The upper end of the second link may be pivotally connected to the end of the horizontal strut adjacent the battery, or to the upper end portion of the lower buckstay section. The third link may have its upper end pivotally connected to the end of the horizontal strut adjacent the upper end of the vertical strut, or to the said upper end of the last mentioned strut.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a side elevation of a portion of a coke oven battery;

Fig. 2 is a partial section on the line 2—2 of Fig. 1;

Fig. 3 is an enlarged reproduction of a portion of Fig. 2 illustrating the relative disposition of upper and lower masonry and buckstay sections after battery expansion has occurred;

Fig. 4 is a section similar to Fig. 2 illustrating the relative disposition of the upper and lower masonry and buckstay sections before expansion has occurred;

Fig. 5 is a partial section on the line 5—5 of Fig. 4;

Fig. 6 is a partial section on the line 6—6 of Fig. 4;

Fig. 7 is a partial section on the line 7—7 of Fig. 3;

Fig. 8 is a partial section taken similarly to Fig. 1 through a battery having its lower and upper sections formed of silica bricks;

Fig. 9 is an enlarged reproduction of a portion of Fig. 8;

Fig. 10 is a partial horizontal section on the line 10—10 of Fig. 9; and

Fig. 11 is a partial vertical section on the line 11—11 of Fig. 9.

The coke oven battery structure, illustrated by way of example in Figs. 1 and 2, is a conventional form of the well known type, commonly referred to as the "Otto underfire type," in which the upper portion of the battery structure is formed with a plurality of side by side coking chambers 1 extending transversely to the length of the battery between the opposite sides of the latter, with heating walls between the coking chambers and formed with vertical flues 2. Regenerator chambers 3 are formed in the lower portion of the brickwork mass. A horizontal brickwork body or oven base portion 4 is interposed between the coking chambers 1 and the regenerator chambers 3 and forms the floor for the over chambers and the roof for the regenerator chambers.

In the construction shown in Figs. 1 to 7, the brickwork body 4 and the heating walls and lower portion of the roofs of the coking chambers are formed with silica bricks, while the portion of the brickwork below the body 4 and above the slab of concrete 5 which directly supports the battery brickwork mass, are formed of clay bricks having a substantially smaller thermal co-efficient of expansion than silica bricks. The concrete slab 5 is supported by columns 6 which extend through the subway space 7, characteristic of underfired oven batteries, between the concrete mass 5 and the battery foundation 8. The oven cover 8' customarily comprises a lower portion formed of silica bricks and an upper portion formed of clay bricks. Owing to the difference between the thermal expansion co-efficients of silica bricks and clay bricks, the oven walls including the base member 4 expand horizontally relative to the subjacent brickwork, in a direction transverse to the vertical central longitudinal plane of the battery. The relative positions of the base portion 4 and subjacent portion of the battery structure before and after the battery is heated up and expands, are shown in Figs. 3 and 4 respectively. As is well known, coke ovens are formed with transverse expansion joints which reduce the expansion of the battery in the direction of its length, to a relatively small amount.

As shown, rich fuel gas may be supplied to the combustion flues 2 through vertical channels 9 formed in the regenerator division walls and channels 10 formed in the base portion 4. The lower ends of the flues 2 may be connected to the regenerator chamber by channels (not shown) which extend through the base member 4. The upper end portions 9' of the channels 9 are horizontally elongated in a direction transverse to the battery length, to insure communication between each channel 9 and the corresponding flue 2 at all times, notwithstanding the expansion of the base portion relative to the subjacent portion of the coke oven brickwork.

Each end of each heating wall is engaged by a corresponding upper vertical buckstay section or member 11, and portions of the sides of the battery below the base portion 4 are engaged by lower buckstay sections or members 12, there being one member or buckstay section 12 beneath and associated with each upper buckstay section or member 11. Horizontal tie rods 13 at the top of the battery form tension connections between the upper end of each upper buckstay section 11 at one side of the battery and the upper end of a corresponding upper buckstay section at the opposite side of the battery. The lower end of the lower buckstay sections 12 are anchored to the concrete slab 5 by anchor bolts 14. As shown, the bolts 14 support bracket members 15 on which the lower ends of the buckstay sections 12 are supported.

Compression springs 16 are interposed in customary manner between tension adjusting nuts on the ends of the tie-rods 13 and the upper ends of the upper buckstay sections 11, and between adjusting nuts on the ends of the anchor bolts 14 and the lower ends of the lower buckstay sections 12.

Movement of the upper end of each lower buckstay section 12 away from the vertical longitudinal center plane of the battery, is opposed by a buckstay reinforcing structure comprising a horizontal strut or beam 17, a vertical strut or post 18, and link or tension members 19, 20 and 21. The posts 18 are displaced several feet from the adjacent side of the battery so that the space between the posts 18 and the side of the battery forms a gallery or passageway for battery attendants beneath a bench or platform supported by the beams 17. Each member 19 has its upper end connected to the end of the beam 17 adjacent the corresponding buckstay section 12. The upper end of each member 20 is connected to the end of the beam 17 adjacent the upper end of the post 18. The lower ends of the members 19 and 20 are connected to the upper end of the corresponding member 21 by a connecting member 22. The lower end of the member 21 is connected to the corresponding buckstay section 12 adjacent the lower end of the latter. As shown, the member 21 is divided into opposite end portions connected by a turn-buckle 23. The end of the beam 17 adjacent the corresponding lower buckstay section 12 rests upon a bracket 24 which may be welded or otherwise secured to the front or outer flange 12b of said buckstay section 12. Each buckstay reinforcing structure is similar in general construction and mode of operation to the reinforcing means disclosed and claimed in my said prior Patent 2,199,510. As the battery heats up and expands, the link or tension members 19, 20 and 21 are put under tension and cooperate with the corresponding beam 17 and post 18 to subject the upper end of the corresponding buckstay section 12 to a thrust opposing the tendency of the brickwork expansion to move the upper end of the buckstay section away from the longitudinal vertical center plane of the battery. As the oven brickwork expands, the effective length of the member 21 may be increased by adjustment of the turn-buckle 23 as required to prevent the development of an excessively high tension in the members 19, 20 and 21. Interlocking parts 17" and 24' connected to each beam 17 and corresponding bracket 24, respectively, hold the beam against movement in the direction of its length away from the adjacent buckstay when the adjustment of the turn-buckle 23 is such as to permit such movement.

The lower end of each upper buckstay member 11 and upper end of the adjacent lower buckstay member 12 are cut away to provide overlapping portions and have plate-like parts welded thereto. Those plates include a bearing plate 25 secured to the shorter lower end portion of the portion of the section 11, and resting upon, and in sliding engagement with a horizontal bearing plate 26 secured to the longer upper end portion of the corresponding buckstay section 12.

As shown, each of the plates 25 and 26 has its inner end surface flush with the battery engaging side of the inner flange portion 11a or 12a of the corresponding buckstay section 11 or 12. The other ends of the plates 25 and 26 are supported by subjacent vertical plates 27 and 28, respectively, welded to the webs of the sections 11 and 12. Cooperating horizontal guide plates 29 and 30 are welded to the longer lower end portion of the section 11 and to the shorter upper end portion of the section 12, respectively. Vertical guide bolts 31 extend downward through holes in the plate 30 and through guide slots 32 in the plate 29. The slots 32 are elongated in a direction transverse to the length of the battery. The heads of the bolts 31 engage the upper side of the plate 30 and nuts are threaded on the lower ends of the bolts. The plates 29 and 30 and bolts 31 thus cooperate to prevent displacement of the adjacent ends of the buckstay sections 11 and 12 in a vertical direction or in the direction of the length of the battery.

The movement of the lower end of the buckstay section 11, away from the vertical central longitudinal plane of the battery relative to the upper end of the corresponding lower buckstay section 12, is opposed by a compression spring 34 which surrounds an anchor bolt 33 having its inner end threaded in a socket member 35 welded to the buckstay member 12 and extending between the buckstay flange 12a and the plate 27. The spring acts between a nut 36 threaded on the outer end portion of the anchor bolt and the front or outer flange 11b of the buckstay member 11.

The buckstays at the sides of the coke oven batteries do not control or significantly minimize the expansion of the individual bricks included in the coke oven structure, but are more or less effective in regulating and minimizing the lateral expansion of the battery, by opposing the formation of cracks and the opening of joints in the masonry structure both when the battery is heating up and expanding and also when the battery is cooling down and contracting. The effectiveness of the buckstays in preventing open cracks and joints depends on the character of the battery, its buckstay arrangement and the means pressing the buckstays against the adjacent sides of the battery. As will be readily apparent to those skilled in the art, the buckstay arrangement shown in Figs. 1–7 is adapted to minimize and control the lateral expansion of a battery comprising an upper section formed of silica bricks and a lower section formed of clay bricks in a manner not possible with the usual stiff buckstays extending from the top to the bottom of the battery structure.

With the arrangement shown in Fig. 2, the force with which the lower end of each upper buckstay section 11 is pressed against the adjacent portion of the battery is directly controlled by the tension of the corresponding spring 34 and may be adjusted by adjusting the nut 36 on the corresponding anchor bolt 33. The force with which the upper end of each lower buckstay section 12 is pressed against the adjacent portion of the battery masonry depends upon the extent to which the pull on the section 12 due to the corresponding compression spring 34 is overbalanced by the effect of the longitudinal thrust of the corresponding beam 17 on said section 12. That thrust is controlled by the corresponding turn-buckle 23 and may be adjusted by rotating the latter.

In Figs. 8–11, inclusive, I have illustrated an embodiment of the present invention, adapted for use in a coke oven battery in which the brickwork between the concrete supporting slab 5 and the upper portion of the oven cover is formed of silica bricks so that there is no horizontal sliding movement of the coke oven base portion 4 relative to the immediately subjacent portion of the coke oven brickwork. With the battery shown in Figs. 8–11, however, the expansion of the relatively hot portion of the battery beneath and adjacent the underside of the base portion 4 is substantially greater than the expansion of the cooler portion of the battery above and immediately adjacent the concrete slab 5.

In accordance with the present invention as illustrated in Figs. 8–11, each buckstay at the side of the battery comprises an upper section 11c and a lower section 12c each of I-beam section, which are integrally connected to one another by the inner flange portion 12ca of the buckstay including the sections 11c and 12c. As shown, the portion of the buckstay sections 11a and 12a at the outer side of the flange engaging the side of the battery are severed from one another by a substantially horizontal kerf or cut 40 which extends through the outer edges of the buckstay sections 11c and 12c to the outer side of the inner buckstay flange 12ca.

As shown, the kerf or cut 40 is approximately at the level of the top of the bench supported by the corresponding beam 17, which in the construction shown in Figs. 8–11, as in the construction first described, has its inner end in thrust engagement with the upper end portion of the buckstay section 12c.

The buckstay sections 11c and 12c are advantageously protected from distortion and stiffened against relative movement of their respective web portions in the longitudinal direction of the battery. To this end, as shown, plates 41 parallel to, and at the opposite sides of the web portion of each buckstay section 12c, have lower portions welded to the latter and have upper portions extending upward into overlapping and guiding engagement with the sides of the web portion of the buckstay portion 11c, as is clearly shown in Figs. 9 and 11.

Except in respect to the use of clay bricks instead of silica bricks in the lower portions of the battery shown in Figs. 8–11, and the resultant avoidance of bodily movement of the upper portion of the battery including the base portion A relative to the immediately subjacent portion of the battery structure, and in respect to the differences in form between the buckstays 11 and 12, and the buckstays including the sections 11c and 12c, the batteries shown in Figs. 8–11 may be substantially identical with the batteries shown in Figs. 1–7.

If, as shown, the upper buckstay sections 11c are vertical in the initial, non-expanded condition of the battery, they will still be substantially vertical when the battery is fully expanded, in consequence of the fact that the tendency to brickwork expansion is approximately the same at all levels between the underside of the base portion 4 and the upper edges of the heating walls. The average temperature of the brickwork between the concrete slab 5 and the base portion 4 progressively increases as the distance from the base portion diminishes. In consequence, when the brickwork between the slab 5 and base portion 4 is formed of silica brick, the horizontal expansion of the brickwork in a direction transverse to the length of the battery increases with the distance above the concrete slab.

When the lower masonry section of the battery below the body 4 is formed with preheating chambers for gaseous combustible material, which may be combustion air or both combustion air and lean fuel gas, the average temperature of the lower section masonry will progressively increase as the distance from the base portion 4 diminishes, whether the preheating chambers are ordinarily regenerator chambers, as shown, or are recuperator chambers or passages. In consequence, when the lower masonry portions between the slab 5 and base portion 4 is formed wholly of silica bricks, or has its upper portion formed of silica bricks, the battery expansion in the horizontal direction transverse to the battery length of the upper portion of the lower masonry section, and of the lower portion of the upper masonry section, will be substantially equal. However, whether the lower section is formed wholly of silica bricks, or has its upper portion only formed of silica bricks, or is formed wholly of clay bricks, the average horizontal expansion in a direction transverse to the length of the battery will be greater in the upper masonry section than in the lower masonry section of the battery.

When all, or the upper portion of the lower section is formed of silica bricks so that the transverse horizontal expansion of the upper portion of the lower section is substantially equal to that of the lower portion of the upper section and progressively diminishes in portions of the lower section at progressively smaller distances from the slab 5, the integral connection between the adjacent ends of each buckstay section 12c and the corresponding buckstay section 11c formed by the portion of the flange 11ca adjacent the kerf 40, serves as a hinge joint. The provision of that hinge joint avoids most of the bending stress to which the buckstay sections, and particularly the lower buckstay sections 12c would be subjected if each lower buckstay section 12c were not partially severed from the corresponding upper section as along the length of the kerf 40.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In a coke oven battery comprising a masonry upper section with elongated coking chambers therein extending between the opposite sides of the batteries and with heating walls at the sides of the coking chambers and comprising a lower masonry section with chambers therein for preheating gaseous combustion material, said upper section having a higher average thermal expansion in the horizontal direction transverse to the length of the battery than said lower section, the improvement comprising vertical buckstays at the sides of the battery each comprising a lower section and an upper section movable relative to said lower section and yielding means directly interconnecting the adjacent upper and lower buckstay sections for differential movement of the sections, the said connection directly opposing the movement of the upper section relative to the lower section, and associated means for regulating the relative movements of the adjacent upper and lower buckstay sections.

2. A coke oven battery improvement as specified in claim 1, in which the adjacent upper and lower buckstay section ends are hinge connected to one another.

3. A coke oven battery improvement as specified in claim 1, in which the upper end of each lower buckstay section is formed with a support for the lower end of the corresponding upper buckstay section, and comprising means resiliently opposing movement of each upper buckstay section relative to the lower buckstay section when the upper portion of the battery expands relative to the lower section, and means external to the battery masonry opposing the tendency of the lower buckstay sections to move away from the battery axis as the lower section of the battery expands.

4. A coke oven battery improvement as specified in claim 1, in which each lower buckstay section has a bearing plate at its upper end, and in which each upper buckstay section has a bearing plate at its lower end adapted to engage and bear against the bearing plate of the adjacent lower buckstay section, and move relatively thereto away from the battery axis as the upper section of the battery expands relative to the lower portion, and means opposing movement of the adjacent ends of the upper and lower buckstay sections, in the direction in which they move as the portions of the battery engaged by said buckstay sections expand and increase in width.

5. An improvement as specified in claim 1, in which each associated lower and upper section comprise lower and upper portions of a single vertical buckstay having its outer flange and web transversely severed to form said portions, and in which the unsevered inner flange of the buckstay is integrally attached to each of the severed web portions and forms a flexible hinge connecting said web portions.

CARL OTTO.

References Cited in the file of this patent

UNITED STATES PATENTS

| Number | Name | Date |
|---|---|---|
| 1,193,068 | Roberts | Aug. 1, 1916 |
| 2,147,681 | Van Ackeren | Feb. 21, 1939 |
| 2,199,510 | Otto | May 7, 1940 |
| 2,582,238 | Dobson | Jan. 15, 1952 |

FOREIGN PATENTS

| Number | Country | Date |
|---|---|---|
| 579,268 | Great Britain | July 29, 1946 |
| 609,335 | Great Britain | Oct. 13, 1948 |